(12) United States Patent
Conner

(10) Patent No.: US 7,506,839 B2
(45) Date of Patent: Mar. 24, 2009

(54) ENGINE AIRFRAME J-SEAL DAMPER

(75) Inventor: Steven L. Conner, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 359 days.

(21) Appl. No.: 11/291,013

(22) Filed: Nov. 30, 2005

(65) Prior Publication Data

US 2007/0120008 A1 May 31, 2007

(51) Int. Cl.
*B64D 33/02* (2006.01)

(52) U.S. Cl. .................... 244/53 B; 244/53 R

(58) Field of Classification Search ............ 244/53 R, 244/53 B; 137/15.1, 15.2; 138/39; 277/644, 277/637, 630, 647, 632, 543, 928, 929; 60/797
See application file for complete search history.

(56) References Cited

U.S. PATENT DOCUMENTS

| | | | |
|---|---|---|---|
| 2,853,854 A | 9/1958 | Avery et al. | |
| 3,721,460 A | 3/1973 | Holman et al. | |
| 3,799,475 A * | 3/1974 | Mitchell et al. | 244/53 B |
| 3,927,695 A * | 12/1975 | Crockwell | 138/137 |
| 4,121,606 A * | 10/1978 | Holland et al. | 137/15.1 |
| 4,158,449 A * | 6/1979 | Sun et al. | 244/136 |
| 4,251,986 A * | 2/1981 | Thompson et al. | 60/797 |
| 4,844,382 A * | 7/1989 | Raisbeck | 244/53 B |
| 4,910,918 A * | 3/1990 | Naples et al. | 49/441 |
| 5,199,718 A * | 4/1993 | Niemiec | 277/552 |
| 5,220,785 A | 6/1993 | Miller | |
| 5,433,070 A | 7/1995 | Amelio | |
| 5,996,936 A * | 12/1999 | Mueller | 244/53 R |
| 6,050,527 A * | 4/2000 | Hebert et al. | 244/210 |
| 6,299,410 B1 * | 10/2001 | Hilbert et al. | 416/145 |
| 6,508,052 B1 * | 1/2003 | Snyder et al. | 60/39.092 |
| 6,557,339 B2 * | 5/2003 | Demay et al. | 60/245 |
| 6,994,144 B2 * | 2/2006 | Fletcher | 160/209 |
| 7,111,705 B2 * | 9/2006 | Ohta et al. | 180/312 |
| 2004/0182348 A1 * | 9/2004 | Sato et al. | 123/184.21 |

FOREIGN PATENT DOCUMENTS

GB          1226297        3/1971

* cited by examiner

*Primary Examiner*—Michael Carone
*Assistant Examiner*—Philip J Bonzell
(74) *Attorney, Agent, or Firm*—Kinney & Lange, P.A.

(57) ABSTRACT

An aircraft fuselage intake duct seal dampens vibration in a compression seal member of an engine case inlet. The intake duct seal includes an inner leg that engages a stationary portion of the compression seal member and comprises a plurality of plenums for allowing inlet air to pass through the inner leg. The intake duct seal also includes an outer leg that engages a movable portion of the compression seal member and comprises a plurality of deflectors and a plurality of ligaments. The deflectors disengage the movable portion of the compression seal member at a threshold pressure such that inlet air bypasses entry into the engine case inlet. The ligaments remain in contact with and dampen vibration of the movable portion of the compression seal member at or above the threshold pressure.

26 Claims, 4 Drawing Sheets

ENGINE AIRFRAME J-SEAL DAMPER

This invention was made with U.S. Government support under contract number FA8611-04-C-2852 awarded by the United States Air Force, and the U.S. Government may have certain rights in the invention.

BACKGROUND OF THE INVENTION

This invention relates generally to gas turbine engines and more particularly to engine case inlet and intake duct seals. In gas turbine powered aircraft, especially military aircraft, there are several advantages in placing the gas turbine engine within the aft portion of the aircraft fuselage. For example, there is less drag as compared with aircraft having wing suspended engine nacelles. In twin engine aircraft, there is less asymmetric yaw produced when one engine fails, as the engines are closer to the center axis of the aircraft. It is also advantageous in stealth aircraft to reduce the radar signature produced by the engine profile. Thus, there are many advantageous in having the engine completely integrated within the aircraft fuselage.

There are, however, disadvantages associated with internal engine placement. Foremost, it is necessary to route air through the fuselage from the front of the aircraft to the engine inlet in order to provide oxygen required for combustion. Problems also arise with overheating of the engine bay since the engine is encapsulated within the fuselage where heat is not readily dissipated. Engine components and other aircraft components located inside the engine bay can overheat and become damaged if the engine bay reaches too high of a temperature. Also, since the engine is in more intimate contact with the fuselage, vibration throughout the aircraft is more pronounced.

In aircraft having internal mounted engines an air intake duct is typically integrated with the aircraft fuselage and connects the front of the aircraft with the engine case inlet in order to provide oxygen to the engines for supporting combustion. A portion of this inlet air can be diverted from flowing into the engine case, to flowing around the exterior of the engine case in order to cool the engine bay. This can be accomplished by using a plenum system in the intake duct seal that permits a pressure differential across the seal to mechanically disengage a compression seal between the intake duct and engine case inlet. A small amount of inlet air then passes through and cools the engine bay. However, high cycle fatigue produced by engine vibration and acoustics can cause cracks to form in the compression seal, which leads to failure of the compression seal.

BRIEF SUMMARY OF THE INVENTION

The present invention is directed toward an aircraft fuselage intake duct seal for dampening vibration in a compression seal member of an engine case inlet. The intake duct seal comprises an inner leg and an outer leg. The inner leg engages a stationary portion of the compression seal member and comprises a plurality of plenums for allowing inlet air to pass through the inner leg. The outer leg engages a movable portion of the compression seal member and comprises a plurality of deflectors and a plurality of ligaments. The deflectors disengage the movable portion of the compression seal member at a threshold pressure such that inlet air bypasses entry into the engine case inlet. The ligaments remain in contact with and dampen vibration of the movable portion of the compression seal member at and above the threshold pressure.

DETAILED DESCRIPTION

Figure 1:
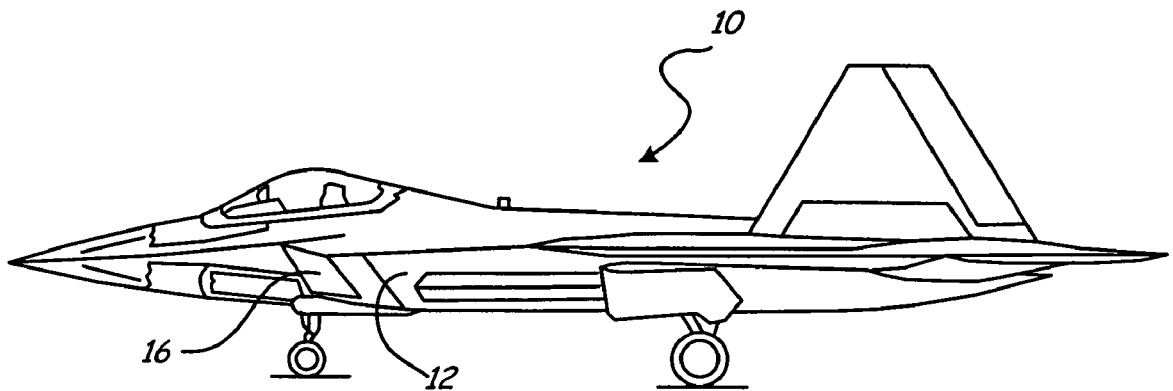
FIG. 1 shows a side view of a gas turbine powered aircraft in which the present invention may be used.
Figure 2:
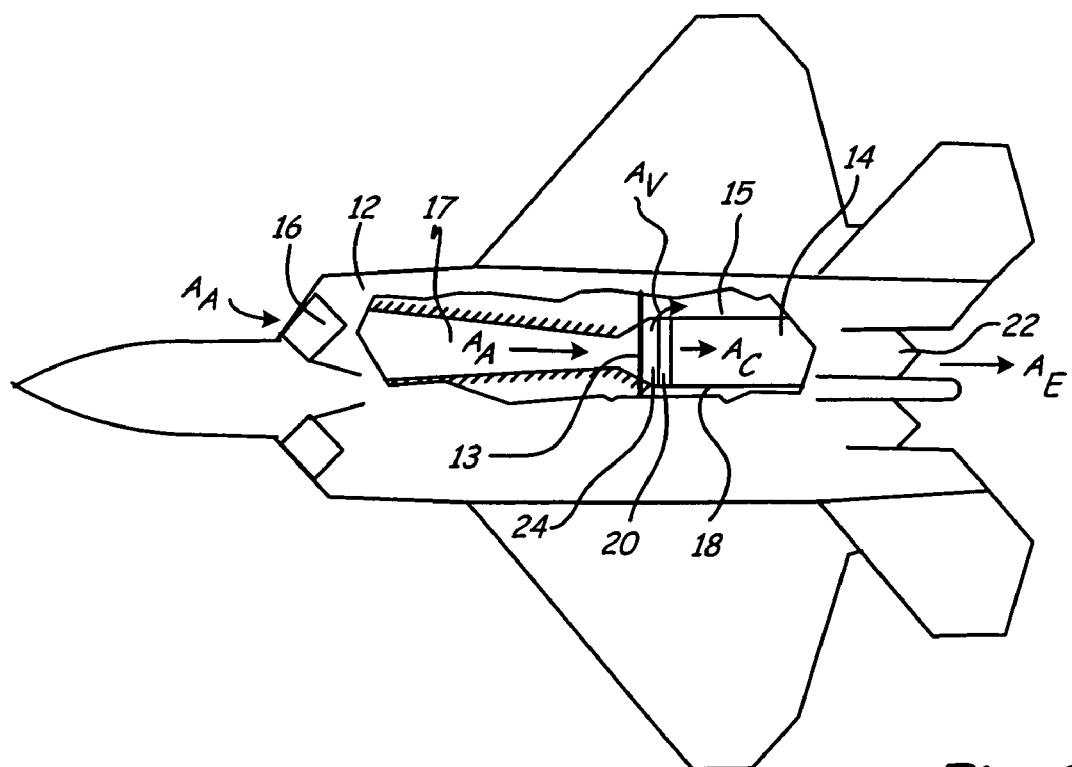
FIG. 2 shows a partially cut away bottom view of the aircraft of FIG. 1 showing a compression seal between the aircraft intake duct and the engine case inlet of the gas turbine engine.

FIG. 1 shows a side view of and FIG. 2 shows a partially cut away bottom view of gas turbine engine powered aircraft 10. Aircraft 10 includes fuselage 12, bulkhead 13, gas turbine engine 14, engine bay 15, inlet 16 and intake duct 17. Engine 14, which is situated in engine bay 15, includes engine case 18, J-seal 20 and exhaust nozzle 22. Intake duct 17 is integrated with fuselage 12 and is mated with K-seal 24 at bulkhead 13. J-seal 20 is located at the forward end of engine case 18 and couples with K-seal 24 to form a compression seal. Thus, engine case 18 is linked with intake duct 17 through a compression seal formed by J-seal 20 and K-seal 24, and air is thereby routed from inlet 16 to engine 14.

Aircraft 10 is driven with thrust produced by combusting fuel in air compressed inside engine 14. Ambient air $A_A$ enters inlet 16 and travels through intake duct 17 on its way to engine 14. A majority of ambient air $A_A$ passes into engine 14 where it is compressed and used to sustain combustion. Combusted air $A_C$ is passed through exhaust nozzle 22 and exhaust air $A_E$ is expelled from engine 14. Aircraft 10 is thus propelled by combusted air $A_C$ being forced through exhaust nozzle 22. During combustion in engine 14, a significant amount of heat is produced, which can elevate the temperature in engine bay 15 to levels hazardous to the operation of aircraft 10. Heat is drawn away from engine bay 15 by directing a portion of ambient air $A_A$ (vented air $A_V$) away from engine 14 and into engine bay 15 with a plenum system located in K-seal 24. Vented air $A_V$ is much cooler than the temperatures produced in engine bay 15 by engine 14 and is therefore capable reducing the temperature inside engine bay 15. The volume of vented air $A_V$ is minor compared to ambient air $A_A$ and is exhausted from aircraft 10 through bleed vents in fuselage 12. Together, J-seal 20 and K-seal 24 form a compression seal, which provides alignment and connection between engine case 18 and intake duct 17.

Figure 3:
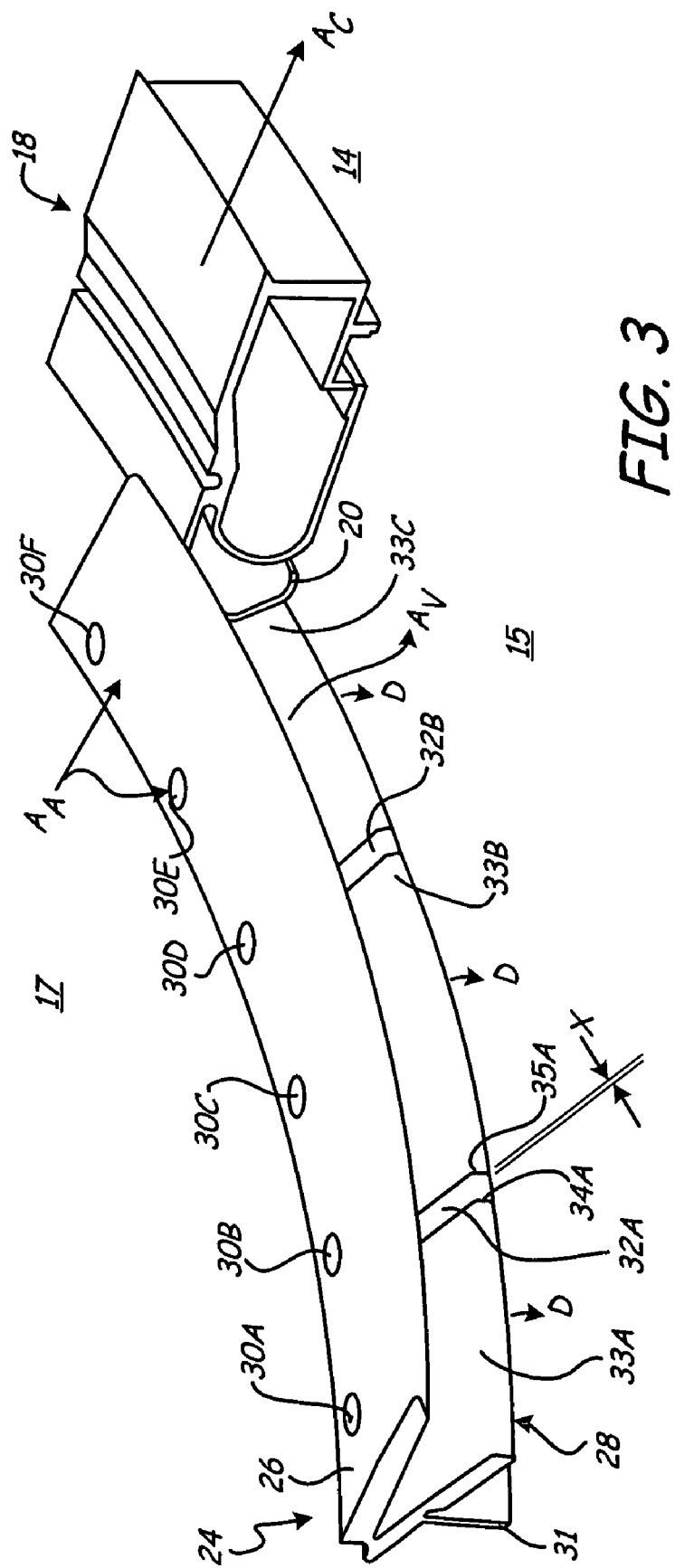
FIG. 3 shows a partially cut-away, perspective view from the viewpoint of inside the engine case of the compression seal of FIG. 2 formed by the interface of a J-seal of the engine case inlet and a K-seal of the intake duct.

FIG. 3 is a cut-away, perspective view of the compression seal and plenum system formed by J-seal 20 and K-seal 24 of aircraft 10 of FIG. 2. For clarity, only a portion of J-seal 20 and K-seal 24 are shown. Normally, K-seal 24 and J-seal 20 entail full 360° rings, comprised of either a single piece or ring segments, which line the aft portion of intake duct 17 and inlet of engine case 18, respectively.

J-seal 20 comprises a cantilevered compression seal member that is integrated with engine case 18. In one embodiment, J-seal 20 is a sheet metal finger extending from engine case 18 and is formed by butt welding segments of 6-4 titanium approximately 0.041 inches (~0.10414 cm) to approximately 0.055 inches (~0.1397 cm) thick to engine case 18.

K-seal 24 includes inner leg 26, outer leg 28, plenums 30A-30F and flange 31. In one embodiment K-seal 24 is comprised of rubber. Flange 31 is used for mounting K-seal 24 with bulkhead 13 of fuselage 12. Plenums 30A-30F are distributed evenly around the circumference of inner leg 26 and allow a portion of ambient air $A_A$ to pass through inner leg 26 and push against outer leg 28 and J-seal 20 as vented air $A_V$. In one embodiment, inner leg 26 comprises sixty-four plenums. The remainder of ambient air $A_A$ passes through K-seal 24 and enters engine 14 as combusted air $A_C$. Outer leg 28 is divided into ligament 32A, ligament 32B and deflectors 33A-33C, which are spaced evenly around the circumference of outer leg 28. Inner leg 26, ligaments 32A and 32B and deflectors 33A-33C abut J-seal 20 such that ligaments 32A and 32B of outer leg 28 deflect J-seal 20 a small amount, thus forming a compression seal. As indicated with arrows D, pressure from ambient air $A_A$ causes deflectors 33A-33C to flex and separate from J-seal 20. This allows ambient air $A_A$ that has flowed inside K-seal 24 to pass into engine bay 15 as vented air $A_V$. Ligaments 32A and 32B are, however, reinforced to stay in contact with J-seal 20 in order to dampen vibration caused by operation of engine 14.

In traditional embodiments of K-seal 24, outer leg 28 does not include ligaments 32A and 32B, but does include deflectors 33A-33C, as vented air $A_V$ is desirable for cooling engine bay 15. The absence of ligaments 32A and 32B in traditional embodiment of K-seal 24 result in outer leg 28 completely disengaging J-seal 20 when deflectors 33A-33C flex at mid and high speed operations of aircraft 10. This prevented dampening of vibrations produced in J-seal 20 by operation of engine 14 with outer leg 28. At low speeds of aircraft 10, for example less than approximately 0.3 Mn to approximately 0.4 Mn, the pressure on outer leg 28 results in only slight damping of J-seal 20 with deflectors 33A-33C. At moderate to high speeds, for example greater than approximately 0.3 Mn to approximately 0.4 Mn, the pressure on outer leg 28 results in little or no damping of J-seal 20 with deflectors 33A-33C. Undamped vibrations in J-seal 20 ultimately lead to high cycle fatigue and failure of J-seal 20.

In the present invention, ligaments 32A and 32B are added to outer leg 28 to remain in contact with J-seal 20 and dampen vibrations produced therein. Ligaments 32A and 32B are formed by making incisions 34A and 34B in outer leg 28 near incisions 35A and 35B already included in outer leg 28 for producing deflectors 33A-33C. Thus, ligaments 32A and 32B are formed by splitting a portion of outer leg 28 from each of deflectors 33A-33C. Incisions 34A and 34B are zero-gap incisions, meaning that they are formed without removing any material from outer leg 28 such that x is approximately equal to zero. In one embodiment, razor blades are used to slice incisions 34A and 34B into a rubber outer leg 28. In one embodiment, ligaments 32A and 32B are distributed around outer leg 28 away from plenums 30A-30F so that they do not interfere with the flow of ambient air $A_A$. Approximately 10% of outer leg 28 remains in contact with J-seal 20 while approximately 90% is allowed to separate during ventilation of engine bay 15. Thirty-two ligaments are spaced around the circumference of outer leg 28 and ligaments are approximately ½ inch (~1.27 cm) wide. In other embodiments, ligaments can vary up to approximately 4.30 inches (~10.922 cm) in width and the number of ligaments can be reduced accordingly to keep 10% of outer leg 28 in contact with J-seal 20. In order to prevent ligaments 32A and 32B from disengaging outer leg 28 when the threshold pressure imbalance is reached, the rigidity of ligaments 32A and 32B is enhanced with reinforcements.

Figure 4:
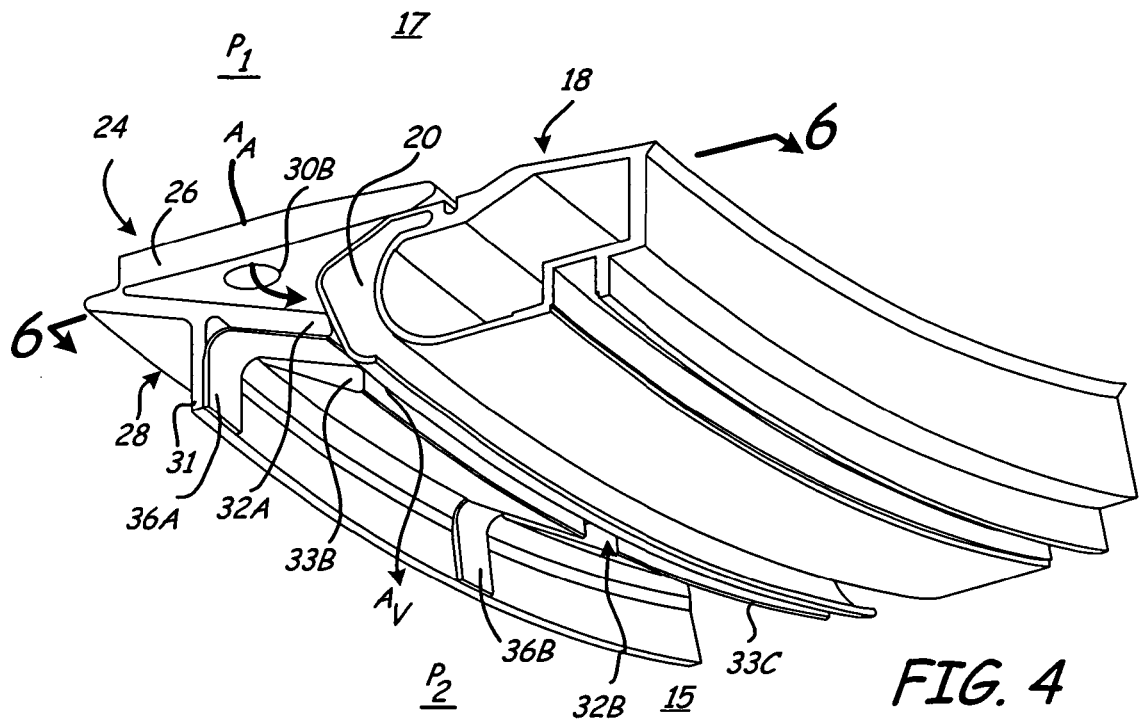
FIG. 4 shows the interface of the J-seal and the K-seal from the viewpoint of underneath the engine case showing deflectors in a flexed position.
Figure 5:
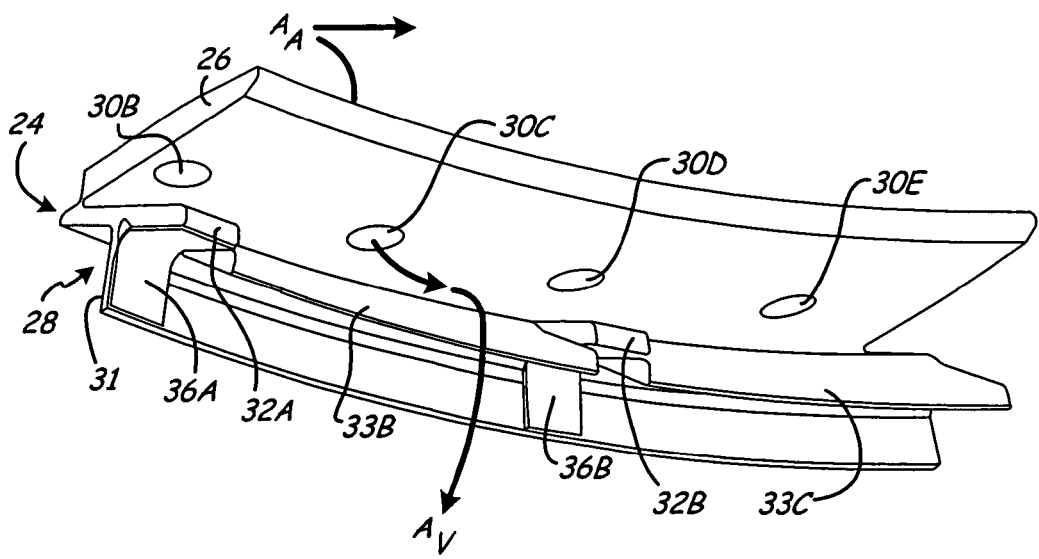
FIG. 5 is a perspective view of the K-seal of FIG. 4 shown without the J-seal in order to show more clearly the flexure of the deflectors.

FIG. 4 shows the interface of J-seal 20 and K-seal 24 from the viewpoint of underneath engine case 18 showing deflectors 33B and 33C in a flexed position. FIG. 5 is a perspective view of K-seal 24 of FIG. 4 shown without J-seal 20 in order to show more clearly the flexure of deflectors 33B and 33C. J-seal 20 engages both inner leg 26 and outer leg 28. At mid to high speed operation of engine 14, ambient air $A_A$ enters plenum 30B and a threshold pressure imbalance is created between $P_1$ inside intake duct 17 and pressure $P_2$ in engine bay 15. Deflectors 33B and 33C flex under the force of pressure $P_1$, driving them out of contact with J-seal 20. When deflectors 33B and 33C flex enough to come out of contact with J-seal 20, a small gap is created between J-seal 20 and deflectors 33B and 33C. Thus, ambient air $A_A$ is allowed to pass into engine bay 15 as vented air $A_V$. Ligaments 32A and 32B, however, remain in contact with J-seal 20 due to reinforcements 36A and 36B.

Figure 6:
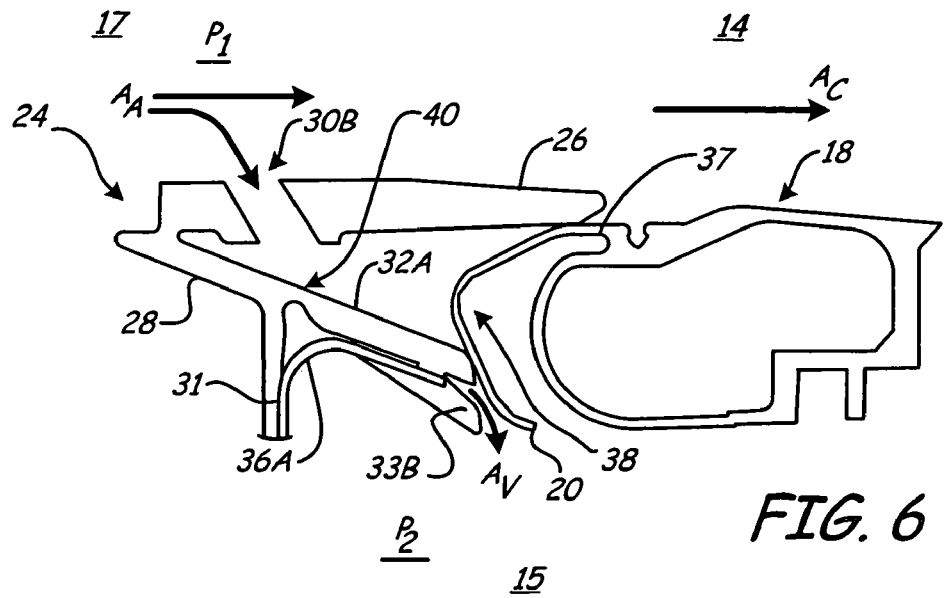
FIG. 6 is a section view along section 6-6 of FIGS. 4 and 5 showing the damping system of the present invention.

FIG. 6 shows cross section 6-6 of FIGS. 4 and 5 showing the compression seal formed by the interface of J-seal 20 and K-seal 24. J-seal 20 is rigidly attached to engine case 18 and includes stationary portion 37 and movable portion 38. K-seal 24 includes inner leg 26, outer leg 28, plenum 30B, mounting flange 31, ligament 32A, deflector 33B, reinforcement member 36A and hinge portion 40. Hinge 40 is an integral member of outer leg 28 and comprises a thinned section of outer leg 28 that flexes under the moment produced by $P_1$ on deflector 33B at the threshold pressure differential. Thus, the threshold pressure differential at which deflector 33B flexes is determined primarily by the thickness of hinge 40 and outer leg 28, amongst other factors. Inner leg 26 of K-seal 24 is butted against stationary portion 37 of J-seal 20, while outer leg 28 is butted against movable portion 38 of J-seal 20. When J-seal 20 is mated with K-seal 24, movable portion 38 of J-seal 20 deflects slightly forming a compression seal. Reinforcement member 36A is positioned between flange 31 and ligament 32A to force ligament 32A into contact with flexible portion 38 of J-seal 20. Reinforcement member 36A is biased between flange 31 and ligament 32A such that flexure of ligament 32A is restrained. In one embodiment, reinforcement member 36A is a generally linear resilient strip of rubber bent so as to be biased between flange 31 and ligament 32A. Reinforcement member 36A is bonded to flange 31 and ligament 32A such that the resiliency of reinforcement member 36A causes it to push ligament 32A into contact with J-seal 20.

During operation of engine 14, ambient air $A_A$ enters K-seal 24 from intake duct 17. A small amount of ambient air $A_A$ enters plenum 30B, while a majority enters engine 14 as combusted air $A_C$. Pressures $P_1$ and $P_2$ are produced in intake duct 17 and engine bay 15, respectively, during operation of engine 14. At rest, or during low speed operation of engine 14, the pressure threshold is not reached and both deflector 33B and ligament 32A of K-seal 24 remain in contact with movable portion 38 of J-seal 20. However, at mid to high speed operation of engine 14, pressure $P_1$ increases. Once the pressure differential between $P_1$ and $P_2$ exceeds the threshold differential, deflector 33B is pushed out of contact with J-seal 20 by ambient air $A_A$, allowing ambient air $A_A$ into engine bay 15 through a gap between J-seal 20 and deflector 33B. Thus, ambient air $A_A$ is forced past engine case 18, drawing heat away from engine bay 15. Reinforcement member 36A, however, prevents ligament 32A, from disengaging moveable portion 38 of J-seal 20, thus eliminating high cycle fatigue wear in J-seal 20.

Figure 7:
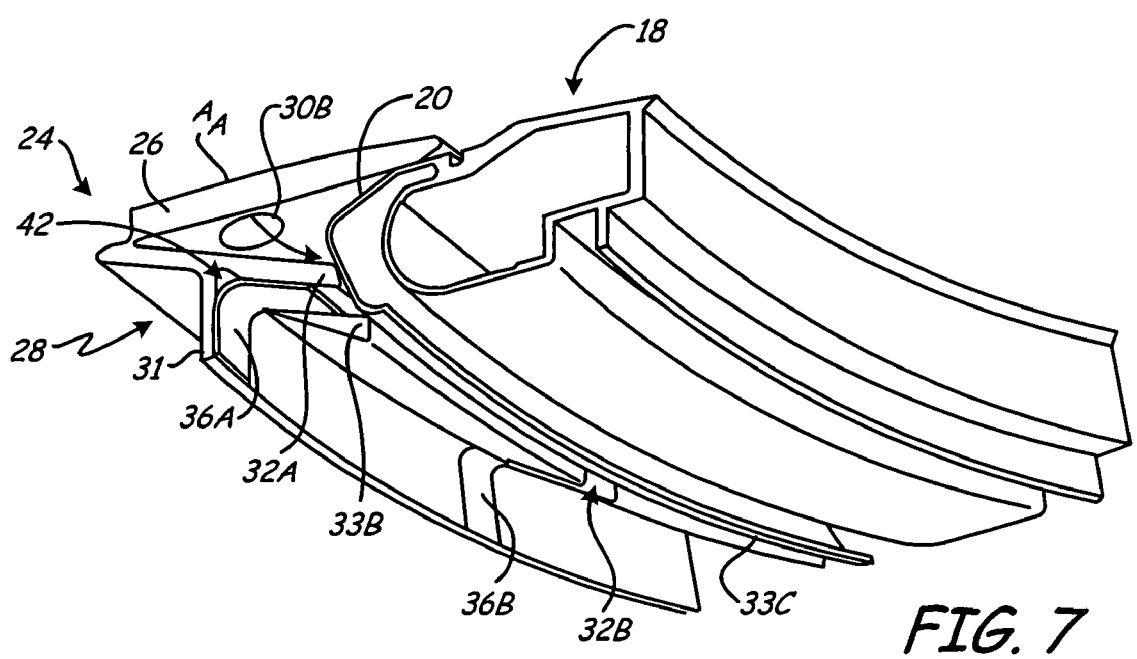
FIG. 7 is a perspective view of another embodiment of the damping system of the present invention.

FIG. 7 shows another embodiment of the damping system of the present invention. Hinge portion 40 of ligament 32A is filled with fillet 42 for impeding flexure of ligament 32A. Fillet 42 fills in the weaker thinned portion of inner leg 26 to resist the moment created at hinge portion 40 by pressure P1 and ambient air AA on ligament 32A. In one embodiment, fillet 42 is a room temperature vulcanizing silicone, or other such suitable material. Reinforcement member 36A and fillet 42 can be used alternatively or simultaneously to impede the flexure of ligament 32A.

Although the present invention has been described with reference to preferred embodiments, workers skilled in the art will recognize that changes may be made in form and detail without departing from the spirit and scope of the invention.

The invention claimed is:

1. An aircraft fuselage intake duct seal for dampening vibration in a compression seal member of an engine case inlet seal, the intake duct seal comprising:
    an inner leg for engaging a stationary portion of the compression seal member of the engine case inlet seal and comprising a plurality of plenums for allowing inlet air to pass through the inner leg; and
    an outer leg for engaging a movable portion of the compression seal member of the engine case inlet seal and comprising:
        a plurality of deflectors for disengaging the movable portion of the compression seal member of the engine case inlet seal at a threshold pressure such that inlet air bypasses entry into the engine case inlet seal; and
        a plurality of ligaments for remaining in contact with and dampening vibration of the movable portion of the compression seal member of the engine case inlet seal.

2. The intake duct seal of claim 1 wherein each of the plurality of ligaments includes a reinforcement to prevent flexure of the ligaments.

3. The intake duct seal of claim 2 wherein the intake duct seal further comprises a mounting flange extending from the outer leg away from the inner leg and positioned adjacent the ligaments, and the reinforcement comprises a resilient strip of material, wherein the strip of material is affixed to the flange and the ligaments such that the strip of material includes a bend to inhibit flexure of the ligament away from the inner leg.

4. The intake duct seal of claim 2 wherein the reinforcement comprises a fillet positioned in a hinged portion of the ligament.

5. The intake duct seal of claim 4 wherein the fillet comprises a room temperature vulcanizing silicone.

6. The intake duct seal of claim 1 wherein the intake duct seal comprises an annular body and the plurality of ligaments comprises ten percent of a circumference of the engine case inlet duct seal outer leg.

7. The intake duct seal of claim 1 wherein the plurality of ligaments deflects the movable portion of the compression seal member of the engine case inlet seal.

8. A damping system for a turbine engine case seal used in venting an engine bay with intake air, the dampening system comprising:
    an annular intake duct seal including a plurality of ligaments formed in an outer leg of the intake duct seal and a plurality of deflectors formed in the outer leg inter-disposed between the plurality of ligaments;
    wherein the plurality of ligaments are configured to continuously contact the engine case seal during venting of the engine bay such that vibration of the engine case seal is dampened; and
    wherein the plurality of deflectors are configured to disengage the engine case seal during the venting of the engine bay to permit the intake air to flow through the intake duct seal.

9. The damping system of claim 8 wherein each of the plurality of ligaments include a reinforcement to prevent flexure of the ligaments.

10. The damping system of claim 9 wherein the reinforcement comprises a resilient strip of rubber.

11. The damping system of claim 9 wherein the reinforcement comprises a fillet positioned in a hinged portion of the ligament.

12. The damping system of claim 11 wherein the fillet comprises a room temperature vulcanizing silicone.

13. The damping system of claim 8 wherein the plurality of ligaments comprises ten percent of the inlet duct seal outer leg.

14. The damping system of claim 8 wherein the plurality of ligaments deflects a movable portion of the engine case seal.

15. A method for fabricating a dampening system in an aircraft intake duct seal comprising a vented inner leg configured to contact a stationary portion of an engine case seal and an outer leg extending from the inner leg and having a plurality of flexible deflectors configured to contact a deflectable portion of the engine case seal, the method comprising:
    forming slits in the outer leg adjacent edges of deflectors to form a plurality of ligaments inter-disposed between the plurality of flexible deflectors along the intake duct seal; and
    reinforcing the ligaments to restrain flexure of the ligaments.

16. The method for fabricating a dampening system of claim 15 wherein the step of reinforcing the ligaments comprises affixing resilient strips of rubber to the ligaments.

17. The method for fabricating a dampening system of claim 16 wherein the intake duct seal further comprises a mounting flange extending from the outer leg and wherein the step of reinforcing the ligaments comprises biasing the resilient strip of rubber between the flange and the ligaments.

18. The method for fabricating a dampening system of claim 16 wherein the step of reinforcing the ligaments comprises placing a fillet in a hinged portion of the ligaments.

19. The method for fabricating a dampening system of claim 15 wherein the step of forming slits in the outer leg adjacent edges of deflectors to form ligaments comprises forming a plurality of ligaments such that ten percent of the intake duct seal outer leg comprises ligaments.

20. The intake duct seal of claim 1 wherein:
    the inner leg comprises:
        a first end for connecting to an aircraft fuselage structure; and
        a second end for engaging the stationary portion of the compression seal member of the engine case inlet seal; and
    the outer leg is connected to the first end of the inner leg and extends across the plurality of plenums, wherein the outer leg includes a plurality of splits to form the plurality of deflectors and the plurality of ligaments.

21. The intake duct seal of claim 20 wherein outer leg extends from the inner leg such that the intake duct seal has v-shaped cross section.

22. The intake duct seal of claim 21 wherein the inner leg and the outer leg contact the compression seal member of the engine case inlet seal to form an enclosure into which inlet air is configured to flow from the plenums, and wherein the plurality of deflectors are configured to disengage the compression seal member of the engine case inlet seal to vent the inlet air from the enclosure when a threshold pressure differential is produced across the deflector.

23. The damping system of claim 8 wherein the intake duct seal further comprises:
   an inner leg including:
      a first end extending from the outer leg; and
      a second end for contacting the engine case seal; and
   the outer leg including:
      a first end connected to the first end of the inner leg; and
      a second end for contacting the engine case seal such that the inner leg, the outer leg and the engine case seal are configured to form a generally triangular shaped enclosure.

24. The damping system of claim 8 wherein the plurality of deflectors are configured to disengage the engine case seal when a threshold pressure differential is produced across the plurality of deflectors.

25. The method for fabricating a dampening system of claim 15 wherein the ligaments are reinforced such that the ligaments remain in contact with the engine case seal at a higher pressure differential across the outer leg than the deflectors.

26. The method for fabricating a dampening system of claim 15 wherein the aircraft intake duct seal comprises an annular structure such that the inner leg, the outer leg and the engine case seal are positioned to form an annular enclosure therebetween.

* * * * *